W. R. COX.
LOCK SWITCH.
APPLICATION FILED SEPT. 7, 1915.
1,267,516.
Patented May 28, 1918.
2 SHEETS—SHEET 1.
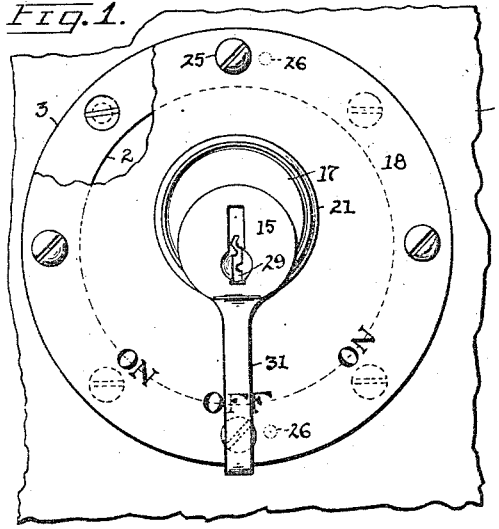
Fig. 1.
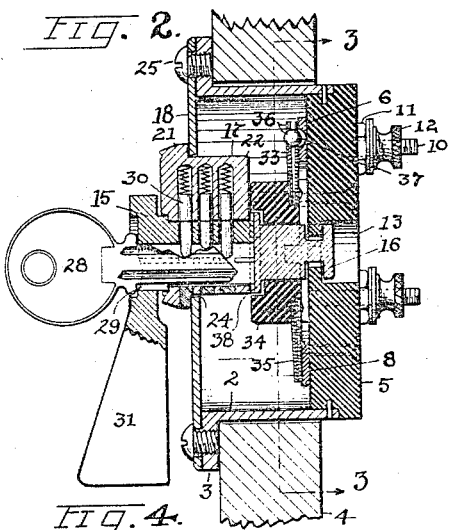
Fig. 2.
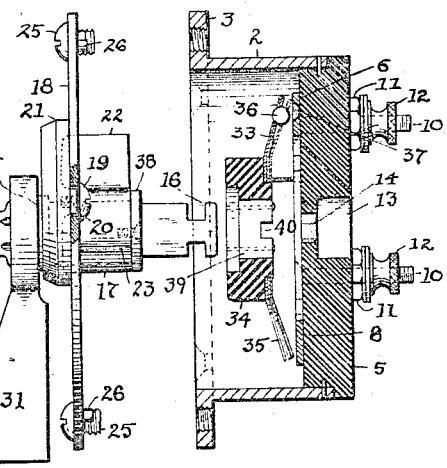
Fig. 3.
Fig. 4.
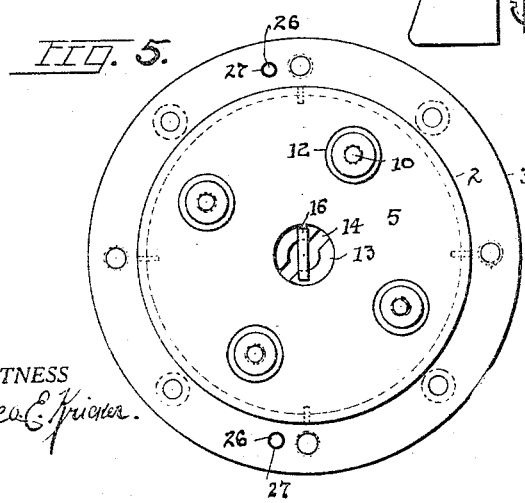
Fig. 5.
WITNESS
Geo E Krieger
INVENTOR.
WARREN R. COX
BY Fisher & Moser
ATTORNEYS.

W. R. COX.
LOCK SWITCH.
APPLICATION FILED SEPT. 7, 1915.
1,267,516.
Patented May 28, 1918.
2 SHEETS—SHEET 2.
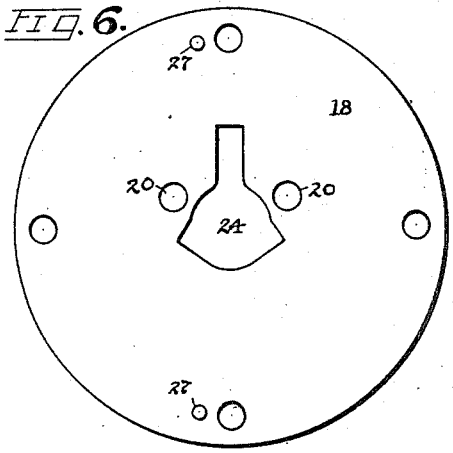
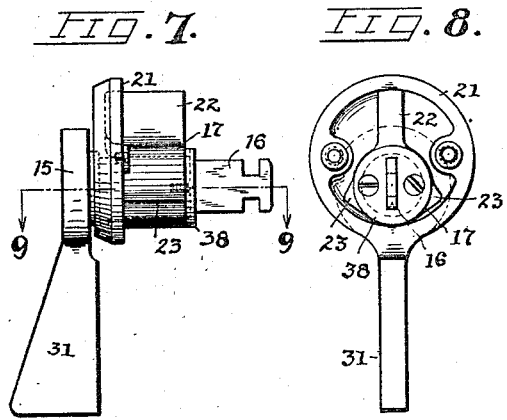
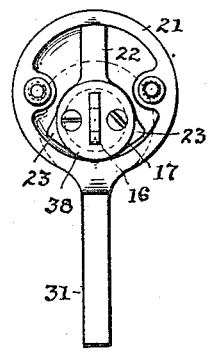
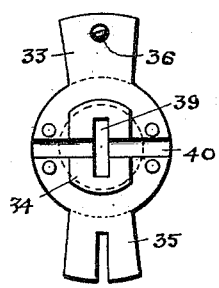
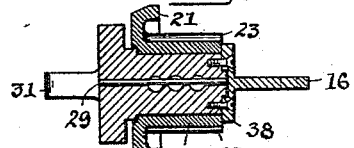
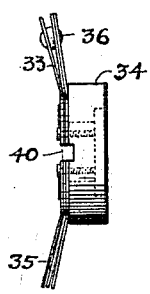
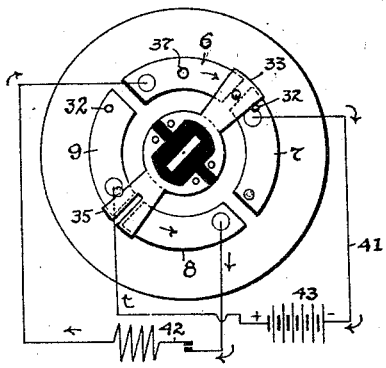
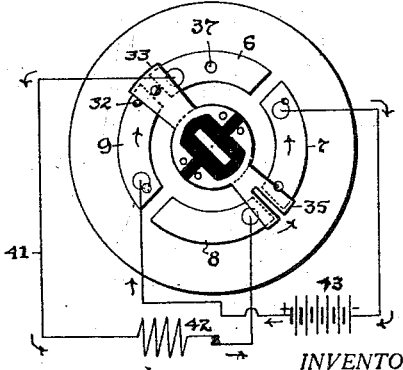
WITNESS
Geo. E. Kricker.
INVENTOR.
Warren R. Cox.
BY Fisher & Moser
ATTORNEYS.

UNITED STATES PATENT OFFICE.

WARREN R. COX, OF CLEVELAND, OHIO.

LOCK-SWITCH.

1,267,516.

Specification of Letters Patent.

Patented May 28, 1918.

Application filed September 7, 1915. Serial No. 49,249.

*To all whom it may concern:*

Be it known that I, WARREN R. COX, a citizen of the United States, residing at Cleveland, in the county of Cuyahoga and State of Ohio, have invented certain new and useful Improvements in Lock-Switches, of which the following is a specification.

This invention relates to a lock switch for the electrical ignition circuit of an automobile engine, the primary object being to provide suitable means to place the electric switch under key control so that unauthorized parties will be unable to start the engine or gain access to the interior of the switch.

The present invention is an improvement on the device disclosed in my Letters Patent of January 23, 1912, No. 1,015,300, and comprises a simplified and more efficient construction all as hereinafter substantially shown and described and more particularly pointed out in the claims.

In the accompanying drawings, Figure 1 is a front view of the switch without a key, and Fig. 2 is a sectional view centrally of the switch showing a key in place therein to permit operation thereof. Fig. 3 is a cross section on line 3—3, Fig. 2. Fig. 4 is a view corresponding to Fig. 2, but partly in elevation and showing the parts as disassembled. Fig. 5 is a rear view of the switch. Fig. 6 is a face view of the front plate, and Figs. 7 and 8 are side and rear views of the shell and plug which are secured to the front plate. Fig. 9 is a view on line 9—9, Fig. 7. Figs. 10 and 11 are front and side views of the rotatable switch contact member. Figs. 12 and 13 are diagrammatic views of the switch and electrical circuit for reversing polarity uses.

The invention comprises a cylindrical casing 2 having a flange 3 at its front adapted to be screwed or otherwise fastened to a stationary body 4, such as the front dash board or cowl frame of an automobile where the device is accessible and in plain view of the operator of the machine. The rear end of casing 2 is closed by a base plate 5 of any suitable insulating material, and a set of four segmental contact strips 6, 7, 8 and 9 are fixed in the form of a circle on the front face of said plate by screws 10 and nuts 11, and separate terminal thumbnuts 12 are also used to make the necessary electrical connections at the rear of the device where protected and concealed behind the board 4. Base plate 5 has a central recess 13 at its rear and a diametrical slot 14 extending through to the front face thereof, and this portion of the base plate is adapted to be detachably engaged by a flat T headed extension 16 screwed upon the inner or rear end of the cylindrical plug 15 which is adapted to rotate within the shell 17 forming a fixed and stationary part of the front plate 18. Shell 17 is a separable part of plate 18 but is secured immovable thereto by two screws 19 which pass through two openings 20 in the plate and enter the circular flange 21 of the shell, the main body of which is more or less rounded and provided with a flat-sided wing 22 and two lateral ribs 23 extending the full length thereof, see Figs. 7, 8 and 9. Plate 18 has a central opening 24 of the same shape as the external outline of the shell body and its wing and ribs, and consequently no independent turning movement of the shell is possible when the plate and shell are assembled as shown in Fig. 4. Plate 18 is detachably secured to the front of casing 2 by screws 25, and a pair of dowel pins 26 on the rear face of the plate extend into correspondingly located openings 27 in the flange 3 of casing 2 to prevent plate 18 from being rotated in the event of unauthorized removal of the fastening screws 25. Briefly, said plate and the parts carried thereby can be separated from the casing only by withdrawal under one condition, that is, when the plug 15 is rotated to place the T headed extension 16 in alinement with the diametrical slot 14 so that it may be disengaged from the base plate 5. Turning of plug 15 is controlled by a key 28 which is adapted to enter the irregular shaped key opening 29 in the plug and engage the spring-pressed and transversely-divided locking bolts 30, see Fig. 2. The key can not be entered or withdrawn except when the respective divided portions of the bolts are in direct alinement with each other as shown in Fig. 2, and when the key is in place the plug 15 can be turned either to the right or to the left by manipulating the key 28 or the kick lever 31 which is an integral part of the plug. Rotation of the plug is limited to an eighth of a turn to right or left from a central position indicated by the word "Off" in Fig. 1, the stops for this purpose comprising two pins 32 extending from contact segments 7 and 9. These stop pins are engaged by the laminated spring arm 33 on the rotatable insulating disk 34 carried by the flat extension 16, and when the arm is engaged with one or the other of the pins a good electrical contact is established with the ends of segments 6 and 9, or segments 6 and 7, thus bridging the gap between the said segments. A similar laminated spring arm 35 is secured to disk 34 on the opposite side of its diametrical center, but this arm is split radially at its end and adapted to overlap the opposed ends of segments 7 and 8, or 8 and 9, dependent upon the position elected. The neutral or central position of the switch member is maintained by a small sphere or metal ball 36 confined between the spring laminations of arm 33 within relatively smaller openings therein, the ball projecting sufficiently at the rear of the arm so that it may enter and come to rest within the depression 37 at the center of segment 6 and also at the gaps between the segments. In this way the ball insures a snappy action which is felt distinctly in the manipulation of the key, and it assures a positive contact position of the arm in all of its working positions.

The switch member comprising disk 34 and arms 33 and 35 is a free or floating member, held in working position by the extension 16 and the rear end of shell 17 when the front plate 13 is secured to the casing 2. The spring arms 33 and 35 are bowed normally, but straighten out more or less when the parts are assembled, thus placing the switch member under tension or back pressure. However, this back pressure is removed purposely from the rotatable plug 15 and its extension 16 and transferred to the stationary shell 17 by placing the disk 34 in bearing engagement with the rear face of the shell where radially extended by wing 22 and ribs 23. The flanged head 38 of the flat extension 16 holds the said plug within the shell so that it may turn freely without unnecessary play, and disk 34 is recessed centrally at its front to house said head with sufficient clearance all around so that no end pressure is brought to bear upon it or the plug, thereby preventing the locking bolts for the plug and the key from sticking. The opening 39 extending through disk 34 is flat sided to conform to the extension 16 so that turning movement may be imparted to the switch member, but said parts are easily separated when plate 13 is withdrawn as illustrated in Fig. 4. A diametrical slot 40 is also cut into the rear face of disk 34 to separate the arms 33 and 35 and place them in insulated relation, and the face of each arm is shown as bifurcated and riveted to the rear face of the disk. In this way I produce a simple and effective reversing polarity switch without the use of cross ties or bus bars and reduce the possibility of short circuiting to a minimum. Figs. 12 and 13 illustrate the reversing positions of the switch whereby the electric current is caused to travel in opposite directions over the same electrical circuit 41 at the election of the operator to insure even wear and to avoid pitting of the contact points of the magneto or vibrator 42. Obviously, when the switch member is in a neutral or central position the electric current from the battery 43 or other source of current is cut off. In operation, the key 28 is inserted within the cylindrical plug which raises the locking bolts. A turning movement either to the right or left by key or the thick lever switches on the electric current. This locks the key so it can not be removed individually but in one of these shifted positions the T head of the extension 16 is brought into alinement with the diametrical slot 14 in base plate 5, thereby permitting the front plate with all the parts carried thereby, including the key, to be bodily removed, providing the screws 25 are also removed. In brief, the switch cannot be operated, nor access gained to the interior of the casing, without the proper key.

What I claim is:

1. A cylindrical casing having a base member of insulating material at its rear, electric switch contacts upon said base member, a cover plate for said casing, and a key-controlled locking device carried by said cover comprising a shell having a rotatable plug provided with a locking extension for the base, and a disk of insulating material loosely sleeved upon said extension in thrust engagement with said shell and having spring arms engaged with said switch contacts.

2. A cylindrical casing having a base plate, a set of switch contacts upon said base plate, a disk having spring arms adapted to engage said contacts, a cover plate for said casing, a shell affixed to said casing and abutting the said disk, locking bolts and a rotatable plug within said shell, a flat extension for said plug having a locking extremity to engage said base plate, and said disk and base plate being of insulating material to electrically insulate said switch contacts and spring arms from all of the other parts aforesaid.

3. An electric switch comprising a base plate having contact segments thereon, a cylindrical casing having a cover plate and shell thereon, a rotatable plug in said shell having a flat extension, a disk of insulating material having spring contact arms to engage said segments and provided with a central slot sleeved upon said extension, said spring arms being under constant tension to press said disk against said shell without end pressure against said plug.

In testimony whereof I affix my signature in presence of two witnesses.

WARREN R. COX.

Witnesses:
  GEO. E. KRICKER,
  M. SCHWAN.